United States Patent [19]

Dickie

[11] Patent Number: 4,781,347
[45] Date of Patent: Nov. 1, 1988

[54] VIDEO DISPLAY MONITOR

[76] Inventor: Robert G. Dickie, 15 Valley Trail, New Market, Ontario, Canada, L3R 1H1

[21] Appl. No.: 840,392

[22] Filed: Mar. 17, 1986

[51] Int. Cl.⁴ ............................................. F16M 11/12
[52] U.S. Cl. .................................... 248/183; 248/1 F; 248/658; 248/663
[58] Field of Search ............... 248/658, 660, 663, 133, 248/371, 415, 418, 181, 183, 288.3, 349, 179, 1 F, 1 H, 1 I; 403/114, 115, 90

[56] References Cited

U.S. PATENT DOCUMENTS

| | | | |
|---|---|---|---|
| 2,470,620 | 5/1949 | Jackson | 178/7.5 |
| 2,922,997 | 1/1960 | Solheim | 340/367 |
| 2,929,667 | 3/1960 | Jackson | 312/7 |
| 3,087,013 | 4/1963 | Stastny et al. | 178/7.9 |
| 3,136,850 | 6/1964 | Blaker | 178/7.8 |
| 3,175,036 | 3/1965 | Miller, Jr. | 178/7.9 |
| 3,643,020 | 2/1972 | St. George et al. | 178/7.81 |
| 4,006,300 | 2/1977 | Boldt et al. | 358/254 |
| 4,037,256 | 7/1977 | Costa | 358/248 |
| 4,068,961 | 1/1978 | Ebner | 248/181 |
| 4,080,631 | 4/1978 | Puhak | 358/248 |
| 4,306,253 | 12/1981 | Nakamura | 358/248 |
| 4,338,635 | 7/1982 | Haider et al. | 358/254 |
| 4,354,654 | 10/1982 | Werner et al. | 248/663 |
| 4,360,838 | 11/1982 | Babicz et al. | 358/248 |
| 4,365,779 | 12/1982 | Bates et al. | 248/371 |
| 4,411,480 | 10/1983 | Gibson | 312/7.2 |
| 4,473,206 | 9/1984 | Stillinger | 248/371 |
| 4,483,503 | 11/1984 | Gahan | 248/1 F |
| 4,533,105 | 8/1985 | Cornwell, Jr. et al. | 248/371 |
| 4,542,872 | 9/1985 | Marino et al. | 248/183 |
| 4,549,710 | 10/1985 | Prince | 248/1 F |
| 4,554,590 | 11/1985 | Chelin | 248/1 F |
| 4,562,988 | 1/1986 | Bumgardner | 248/349 |
| 4,564,166 | 1/1986 | Craft | 248/349 |
| 4,570,892 | 2/1986 | Czech | 248/1 F |
| 4,589,713 | 5/1986 | Pfuhl | 248/349 |
| 4,605,188 | 8/1986 | Goetz | 248/183 |
| 4,645,153 | 2/1987 | Granzow | 248/181 |
| 4,659,053 | 4/1987 | Holley | 248/663 |

FOREIGN PATENT DOCUMENTS 8600507 1/1986 PCT Int'l Appl. ................ 248/349

Primary Examiner—J. Franklin Foss
Assistant Examiner—Robert A. Olson
Attorney, Agent, or Firm—Woodcock Washburn Kurtz Mackiewicz & Norris

[57] ABSTRACT

An improved housing for a computer terminal display monitor is disclosed. The housing is of unibody type construction and is swivel mounted to the logic printed circuit board base by a T shaped hold-down member. Electrical connections pass from the printed circuit board base into the housing through a chamber within the T shaped hold-down member. Both the monitor printed circuit board and the power printed circuit board are contained within the same housing as the cathode ray tube.

4 Claims, 10 Drawing Sheets

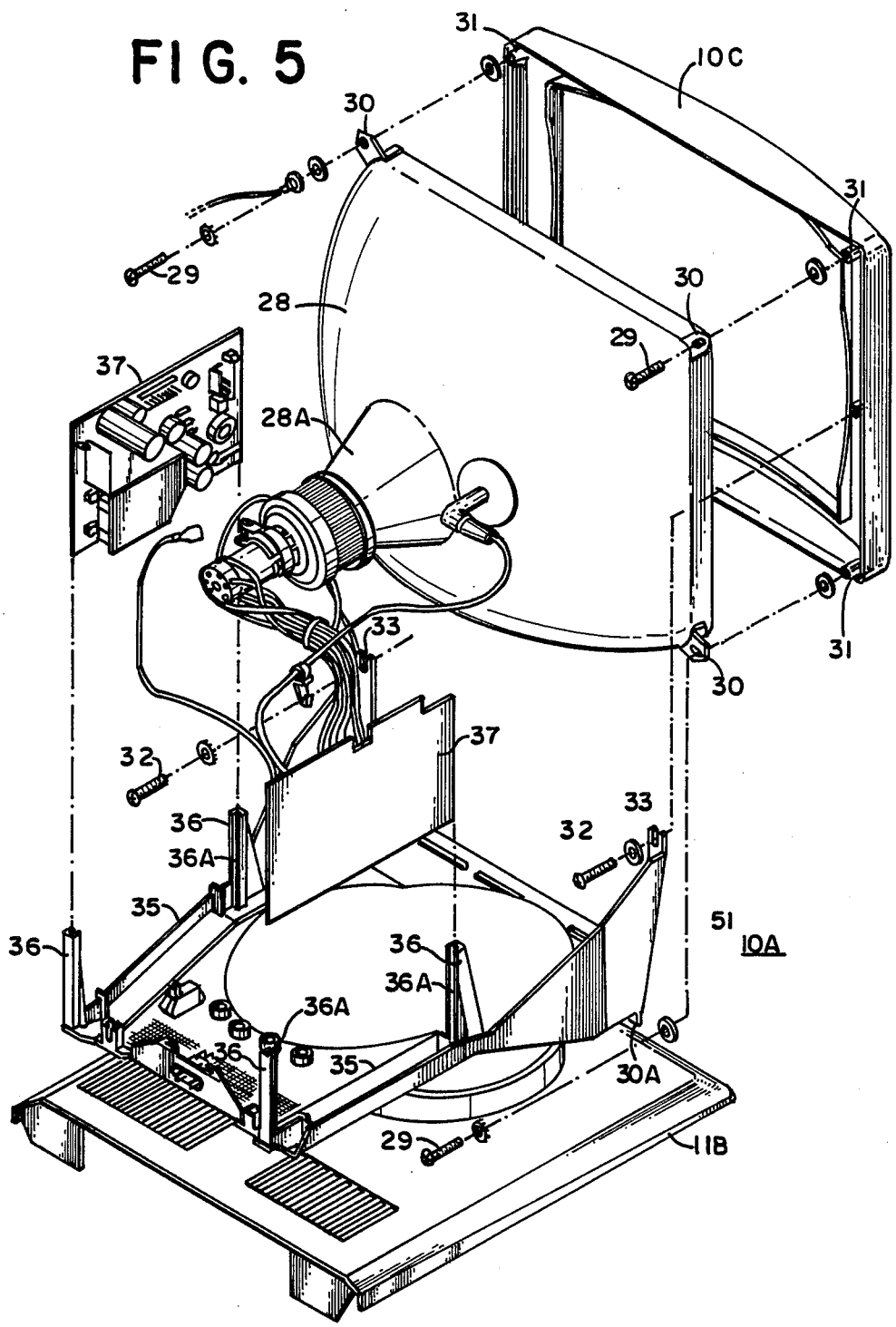

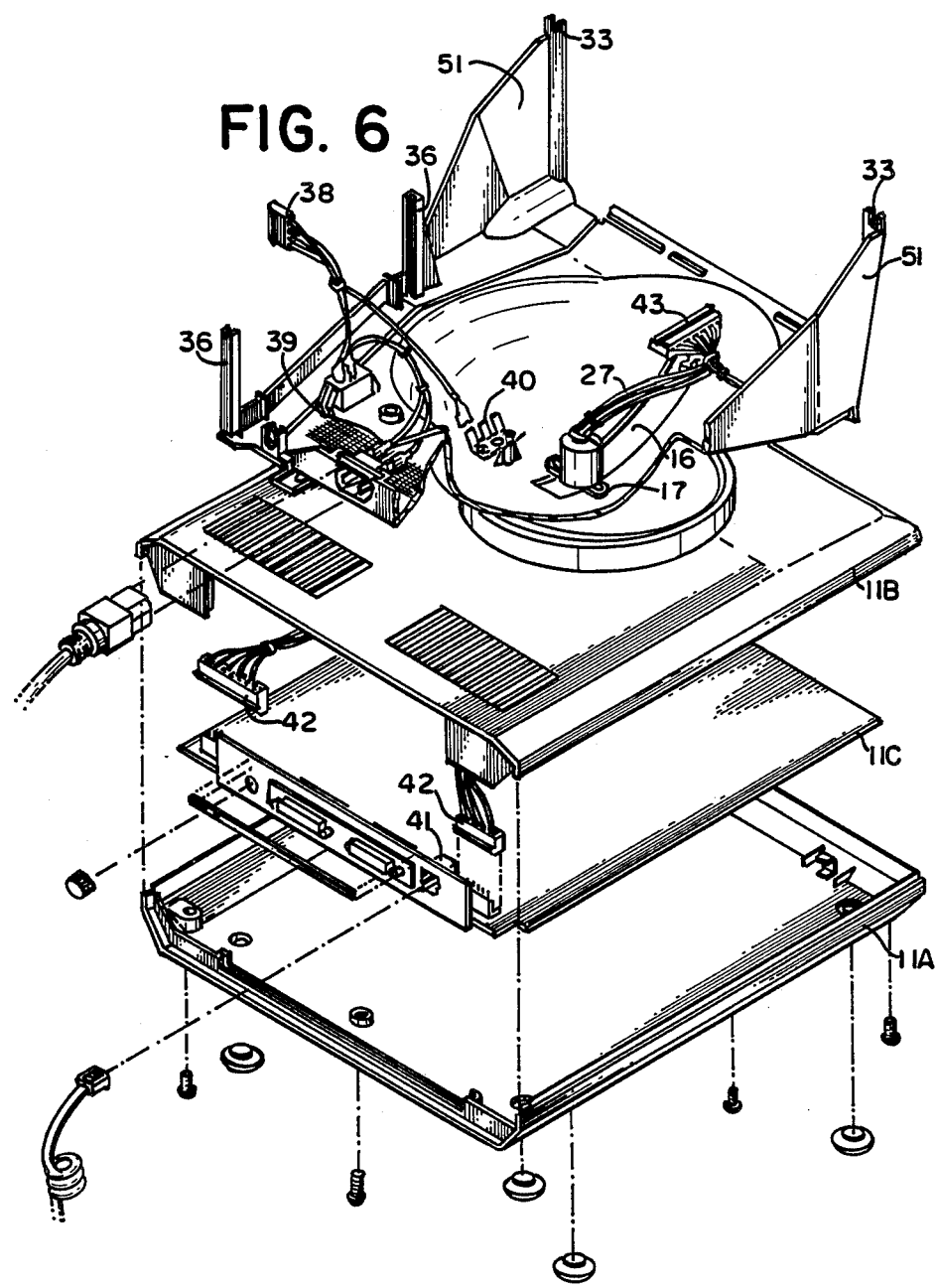

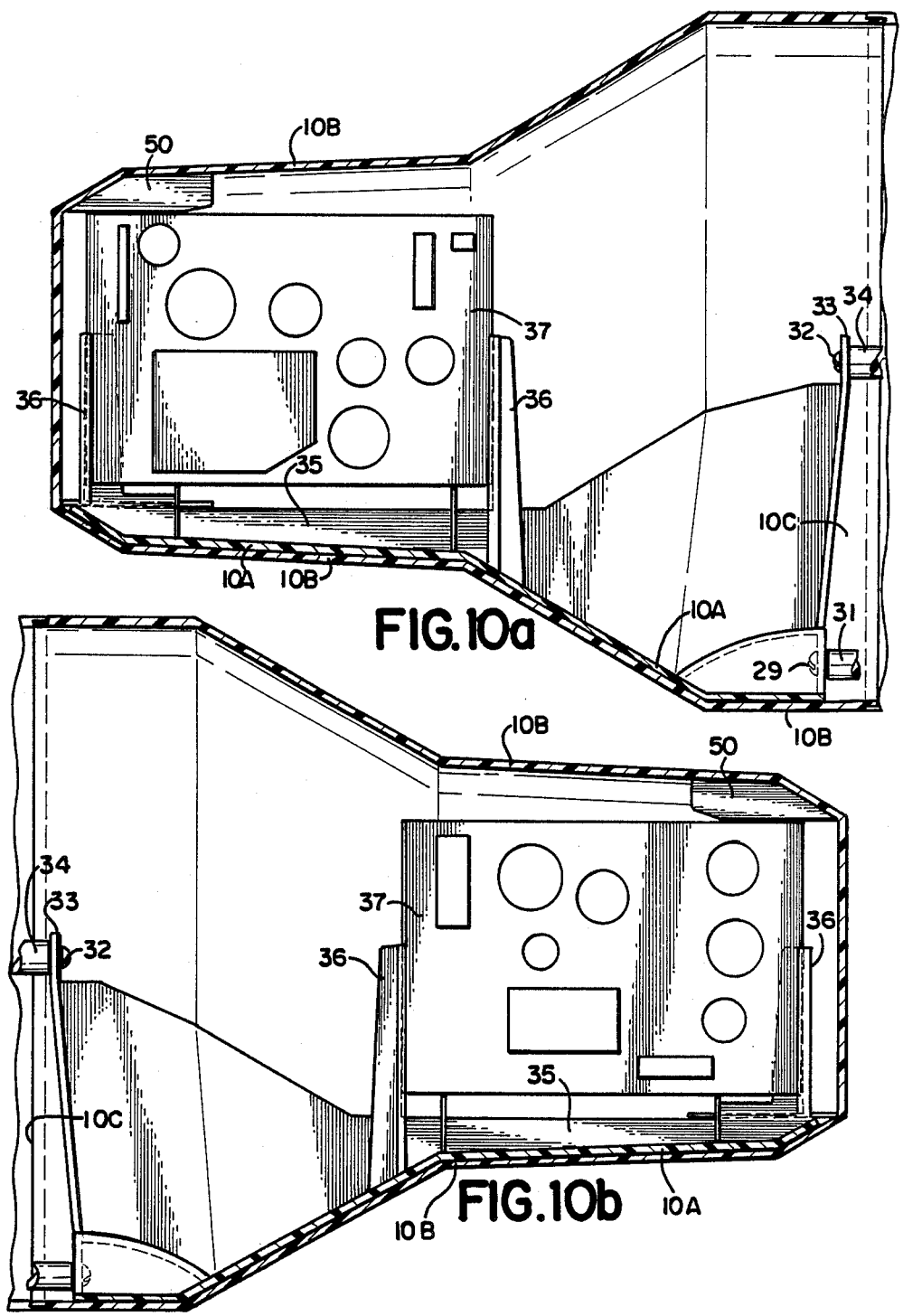

VIDEO DISPLAY MONITOR

CROSS REFERENCE

This application is related by subject matter to co-pending application bearing Ser. No. 06/840393 which is incorporated herein by reference.

BACKGROUND OF THE INVENTION

This invention relates to housings for video display monitors, and more particularly to a housing which contains a cathode ray tube (also known as "CRT") and the printed circuit boards (also known as "PCB") for the CRT.

To a computer user, the most noticeable component of a computer system is the monitor which houses the display screen of the system. Except for the key pad, the display monitor is also that portion of the computer system which requires the most "hands on" interaction between the user and the computer. Because of these considerations, the monitor must be designed with esthetics, flexibility, and portability in mind.

There are generally two separate printed circuit boards associated with the operation of a video display monitor. The first is known as a monitor printed circuit board or MPCB which performs the function of driving the monitor screen itself. The second type is what is known as a power printed circuit board or PPCB which supplies the power to the monitor screen. Both of these printed circuit boards are approximately 7 inches long by 7 inches wide and 4 inches high. In order to maintain the compact nature of the monitor, prior art applications typically place both of these circuit boards in a separate unit known as a base. In a personal computer application, this base also contains the logic printed circuit board for the personal computer. Placing the MCPB and the PPCB in the base portion of the personal computer, however, require additional electrical connections between the base unit and the monitor. In prior art applications these electrical connections were in the form of cables running from the exterior of the base unit to the exterior of the terminal monitor. These exterior connections not only interfere with the esthetics of the video monitor but also increase the possibility of accidental disconnection of the cables.

Because of the diverse use of video monitors, it is desirable that the display screen be adjustable by the user to suit the individual users needs. For example, a tall user may prefer a display screen which is tilted slightly upwards while a short user may desire a display screen which is tilted slightly in a downward direction. In addition, it is desirable to have a monitor housing which is adjustable from left to right so that it may be conveniently placed upon the users desk. Some prior art applications have addressed this problem by mounting the monitor housing in a swivel fashion to the base unit. In certain prior art applications, this base unit also contained electronic components which were connected to the monitor housing through exterior cables as discussed above. The prior art applications which use this method of swivel mounting, however, generally employ a series of bolts, nuts and friction washers in a complex and expensive swivel mount arrangement.

SUMMARY OF THE INVENTION

In accordance with this invention, a cathode ray tube video monitor and the monitor printed circuit board and power printed circuit board associated therewith are contained with a single, light weight, compact housing. The housing is of unibody type construction and all connections between the MPCB and PPCB and the cathode ray tube are contained within the housing. The video monitor housing is swivel mounted to a video monitor base by a T shaped hold-down member which extends from the base into the interior of the housing and holds the circular bottom portion of the housing against a lubricated O-ring coupled to the base. The T-shaped hold down member has a passageway which extends from the interior of the base to the interior of the housing through which the electrical cables from the logic printed circuit board contained within the base can pass in order to make electrical connection with the terminal monitor.

It is an object of the present invention to provide a video display monitor which contains the monitor printed circuit board, the power printed circuit board, and the cathode ray tube within a single housing while still maintaining a compact, light weight, esthetic configuration.

It is another object of this invention to mount the CRT of a video display monitor in a compact and strong housing of unibody type construction which absorbs the CRT mounting stress without requiring a separate supporting frame.

It is another object of this invention to have a video display monitor housing which is swivel mounted to a base containing a logic printed circuit board.

It is a still further object of this invention to provide a means for electrical connection between the cathode ray tube and the various printed circuit boards without the use of exterior cables.

It is another object of this invention to provide a simple but yet effective mechanism for mounting a video display monitor housing to a base.

The foregoing and other objects and features of the present invention will be better understood from the following more detailed description and appended claims.

BRIEF DESCRIPTION OF THE DRAWING

FIG. 5 is an exploded perspective view from behind of a partially assembled monitor showing how the cathode ray tube and the printed circuit boards are contained within the monitor housing.

FIG. 6 is an exploded perspective view from behind showing a partially assembled monitor and revealing the method for assembling the base and making the various electrical connections.

FIGS. 10a and 10b are cross sectional views of the interior of the monitor housing showing the arrangement used for mounting the printed circuit boards within the monitor housing.

DESCRIPTION OF THE PREFERRED EMBODIMENT

Figure 1:
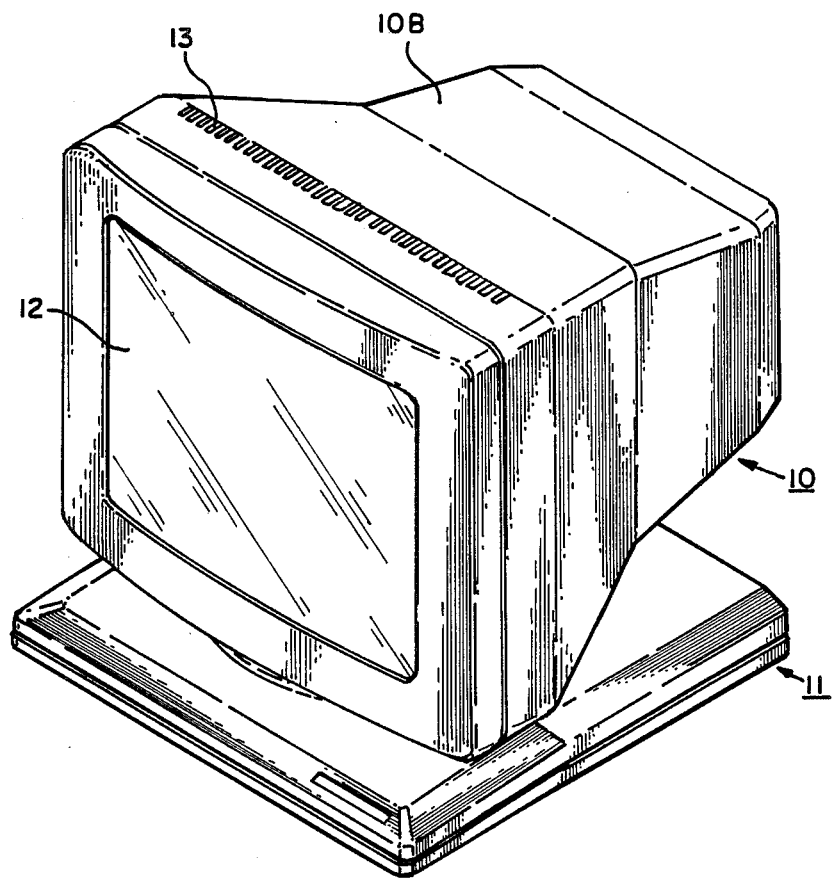
FIG. 1 is a perspective view of the assembled video display monitor.

FIG. 1 is a perspective view of the video display monitor showing the housing, generally designated as 10, and the base, generally designated as 11, to which it is swivel mounted. The display screen 12 of the cathode ray tube is revealed in this view. Top vents 13 provide a means for allowing air to flow through back cover 10B and thereby cool off the interior of the housing.

Figure 2:
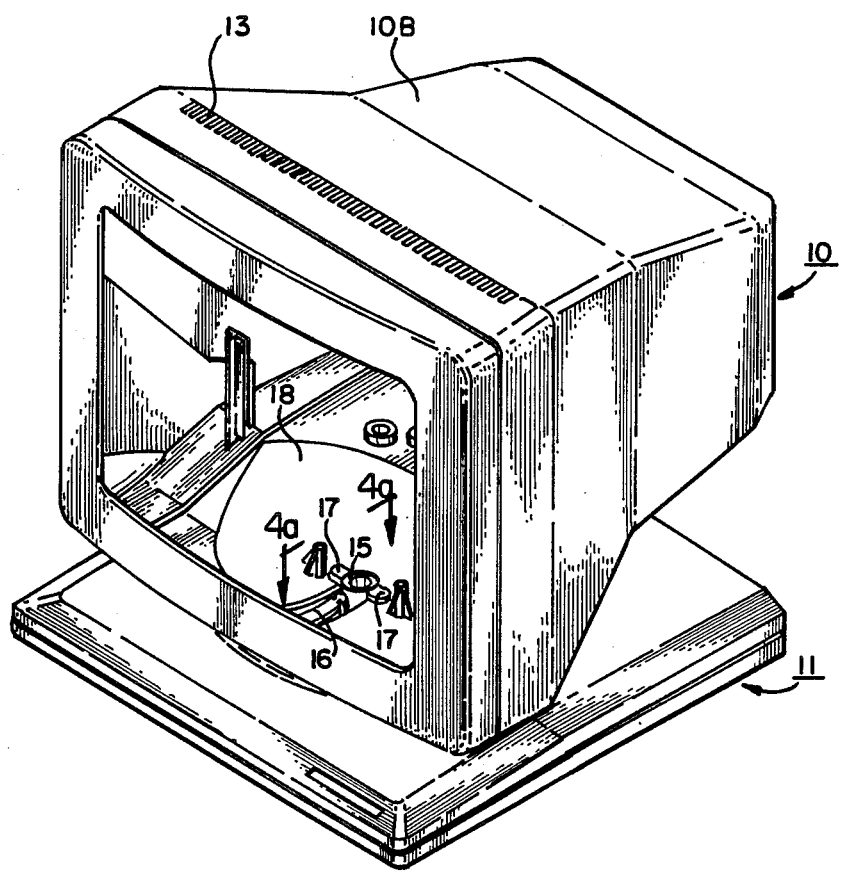
FIG. 2 is a perspective view of the video display monitor in which the cathode ray tube has been removed to reveal the T shaped hold-down member.

FIG. 2 shows a view of the monitor in which the electrical components of the monitor housing have been removed. In this view, T shape hold-down member 15 is seen extending from base 11, through rectangular opening 16 and into the interior of monitor housing 10. Hold-down arms 17 extend from the cylindrical portion of hold-down member 15 and engage the concave inner surface 18 of monitor housing 10. Since hold-down member 15 is rigidly mounted to base 11, the contact between the lower surface of hold-down arm 17 and concave surface 18 serves to hold the lower surface of housing 10 in intimate contact with the upper surface of base 11.

Figure 3:
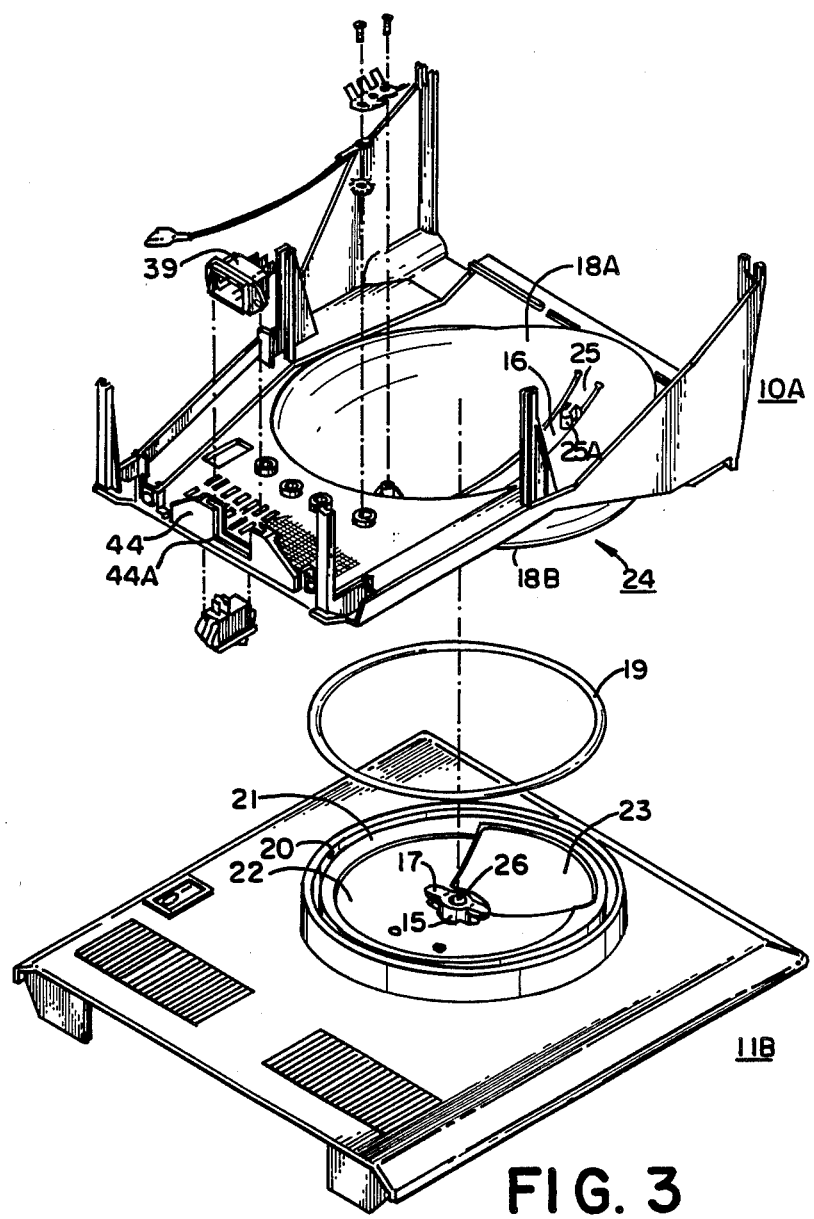
FIG. 3 is an exploded perspective view from behind in which the housing of the video display monitor has been displaced from the base of the video display monitor.

FIG. 3 is an exploded perspective view showing lower support 10A of housing 10 displaced from a mounted position with respect to the top portion 11B of base 11. O-ring 19 is shown displaced from its normal position in which it is contained within annular slot 20 which circumscribes concave disk 21. Concave disk 21 is formed into the outer periphery of concave surface 22. Hold-down member 15 is seen projecting from the center of concave surface 22. Wedge shape opening 23 extends from just above hold down arm 15 to just below annular slot 20 in wedge shape fashion.

Referring now to the lower support 10A of housing 10, rectangular slot 16 is seen extending from the center to the periphery of the ball portion 24 of the lower support. The inner concave surface of ball portion 24 is designated as 18A while the outer convex surface is designated as 18B. Stopping finger 25 is resiliently mounted to lower support 10A of housing 10 and extends into rectangular slot 16. The end 25A of stopping finger 25 projects through the lower surface 18B of the ball portion 24.

Figure 4A:
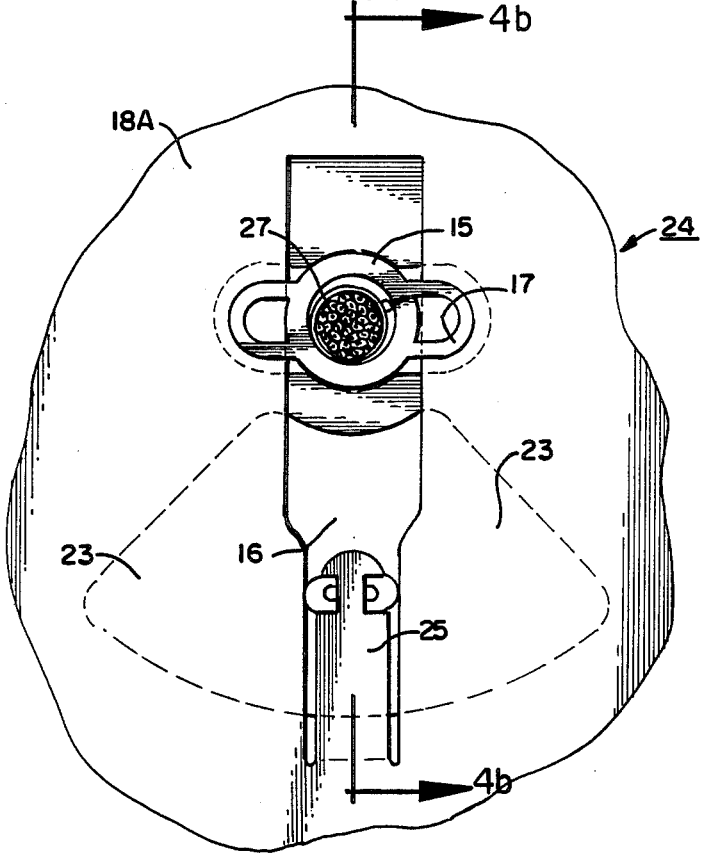
FIG. 4a is a detailed cut away plan view from above of the T shaped hold down member.
Figure 4B:
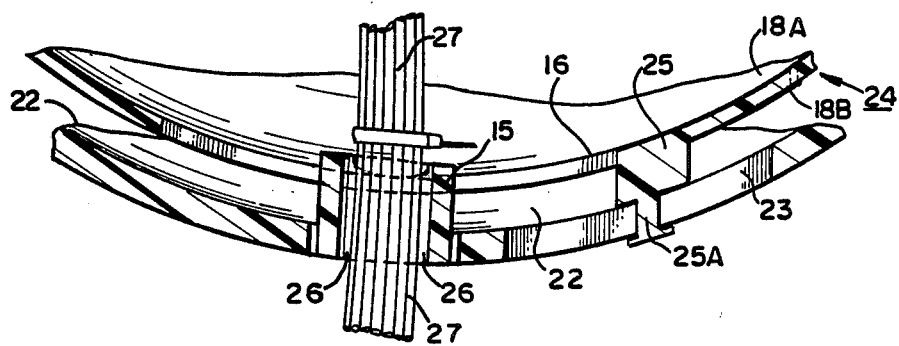
FIG. 4b a detailed and cut away cross sectional view of the T shaped hold down member.

Referring to FIG. 4a, the central portion of concave surface 18A is shown in a position in which the housing 10 is mounted to base 11. FIG. 4b, shows this same view in cross section. In the mounted position, the hold-down arms 17 are in contact with the inner concave surface 18A of ball portion 24. The outer convex surface 18B of ball portion 24 is seen in spaced relationship to concave surface 22 of base 11. The offset and spaced relationship between these surfaces is maintained by lubricated O-ring 19 (shown in FIG. 3). A portion of the outer convex surface 18B is thus always in contact with O-ring 19 while the remainder of the surface is spaced from concave surface 22 and disk 21. In assembled form, the interaction between the lower surface of hold-down arms 17 and inner concave surface 18A provides the following features: (a) the downward force exerted by hold-down arms 17 on the concave surface 18A produces sufficient friction between convex surface 18B and O-ring 19 to maintain the assembled monitor housing 10 in a stationary position when no external force other than gravity is acting upon the computer terminal monitor; (b) said frictional contact is not so great so as to make movement of the monitor housing with respect to base 11 difficult; (c) ball portion 24 is deformed slightly so as to make compression of O-ring 19 uniform; and (d) concave surface 18A is slidable with respect to hold-down arms 17.

O-ring 19 is of a thickness such that its upper surface extends slightly above concave disk 21 and thereby provides a friction surface in the top of the base for contacting ball portion 24. O-ring 19 is made of a resilient material such that when monitor housing 10 is mounted to base 11, the O-ring is compressed by the ball portion 24 of lower support 10A. O-ring 19 is suitably lubricated so as to provide the proper frictional force between its upper surface and surface 18B while simultaneously providing a resilient surface upon which housing 10 may be seated.

Referring once again to FIGS. 4a and 4b, stopping finger 25 is seen extending into rectangular slot 16. Projection 25A of stopping finger 25 extends into wedge shaped opening 23. When monitor housing 10 is moved with respect to base 11, projection 25A travels within wedged shaped opening 23. Projection 25A serves to limit the motion of housing 10 with respect to base 11 by interfering with the perimeter of wedge shaped opening 23 when said movement exceeds certain predefined limits. Stopping finger 25 is resiliently mounted to ball portion 24 and provides the following features: (a) during interengagement between projection 25A and any peripheral edge of wedged opening 23, finger 25 is allowed to flex a predetermined amount so as to prevent destructive interaction between projection 25A and wedge opening 23; and (b) stopping finger 25 is sufficiently resilient to be lifted out of an interfering position with respect to wedge 23 in order to facilitate easy removal of monitor housing 10 from base 11 for the purpose of maintenance and repair. When stopping finger 25 is moved into such non-interfering position, monitor housing 10 can be rotated sufficiently so as to allow entry of hold-down arms 17 into rectangular slot 16. In this position, video display monitor housing 10 can be freely lifted from base 11.

Hold-down member 15, which is integrally mounted to the top portion 11B of base 11, contains a passageway 26 which runs from the interior portion of the base to the interior portion of monitor housing 10. In the preferred embodiment, hold-down member 15 is made entirely of plastic and is molded into base 11. Electrical harness 27 passes through passageway 26 from the interior of base 11 to the interior of housing 10. Since hold-down member 15 is stationary with respect to base 11 and projects into the interior portion of housing 10, electrical harness 27 is not subject to transverse motion at the interface between the base and the housing when the housing is moved with respect to the base. This creates a stable environment for the electrical connections and promotes the operational integrity of the video display monitor.

Referring now to FIG. 5, this exploded perspective view from behind reveals the manner in which the CRT, MPCB, and the PPCB are mounted within the display monitor housing. Lower support 10A of monitor housing 10 is seen mounted to the top portion 11B of base 11 as described earlier. CRT 28 is attached to lower support 10A and the bezzel 10C by CRT mounting screws 29. Mounting screws 29 pass through lower support mounting brackets 30A and CRT mounting brackets 30 and into CRT anchor ports 31 in the bottom corners of bezzel 10C. Bezzel 10C is also attached to lower support 10A by mounting screws 32. Mounting screws 32 pass through support notches 33 and into bezzel ports 34 in the sides of bezzel 10C. Support notches 33 and mounting brackets 30A are formed into upstanding buttresses 51 of lower support 10A. Along each side of lower support 10A is a printed circuit board holding arrangement. This arrangement consists of card supports 35 and upstanding card guides 36. Card supports 35 are mounted to lower support 10A and are substantially parallel to the sides thereof. Card guides 36 project in a substantially perpendicular manner from lower support 10A. Each card guide 36 contains a slot 36A. Both pairs of card guides 36 are spaced so as to receive and hold the appropriate printed circuit board. In this way, printed circuit boards 37 can be easily placed between card guides 36 and into slots 36A during the assembly process. The location of card guides 36 on lower support 10A and the shape of the lower support are such that the neck portion 28A of CRT 28 lies in a non-interfering position between the printed circuit boards 37. Since the neck portion 28A of CRT 28 is substantially narrower than the remainder of the CRT, both the monitor printed circuit board and the power printed circuit board are contained within the same housing as the CRT while requiring little or no increase in the width or length of the terminal monitor housing 10.

The configuration outlined above greatly facilitates the assembly process for the video display monitor. Once CRT 28 is attached to bezzel 10C and bezzel 10C is attached to lower support 10A, the printed circuit boards 37 are merely dropped into the appropriate slots 36A of card guides 36. The printed circuit boards are then electrically connected to the CRT through snap connectors or any other electrical connecting device well known in the art. FIG. 6 show the manner in which the majority of electrical connections utilized by the video display monitor are made. It should be noted that a portion of lower support 10A has been cut away, and the printed circuit boards and CRT removed from this view in order to more clearly illustrate the manner in which the electrical connections are made. Pin connector 38 is used to connect the printed circuit board with the power socket 39 and the CRT receptacle 40. The power for logic printed circuit board 11C is supplied through power socket 41, and the signals from the logic printed circuit board are transmitted to the CRT through pin connectors 42. The electrical cables from pin connectors 42 are collected into electrical harness 27 which passes through chamber 26 in hold down member 15 and into the monitor housing 10. Electrical harness 27 then feeds pin connector 43 which relays the logic board signals to the CRT.

Referring once again to FIG. 3, the configuration used for holding CRT power socket 39 in lower support 10A is revealed. Mounted to the rear periphery of lower support 10A is CRT power socket receptacle 44. Power socket receptacle 44 contains a continuous slot 44A which provides a three sided chamber into which CRT power socket 39 can be placed.

Figure 7:
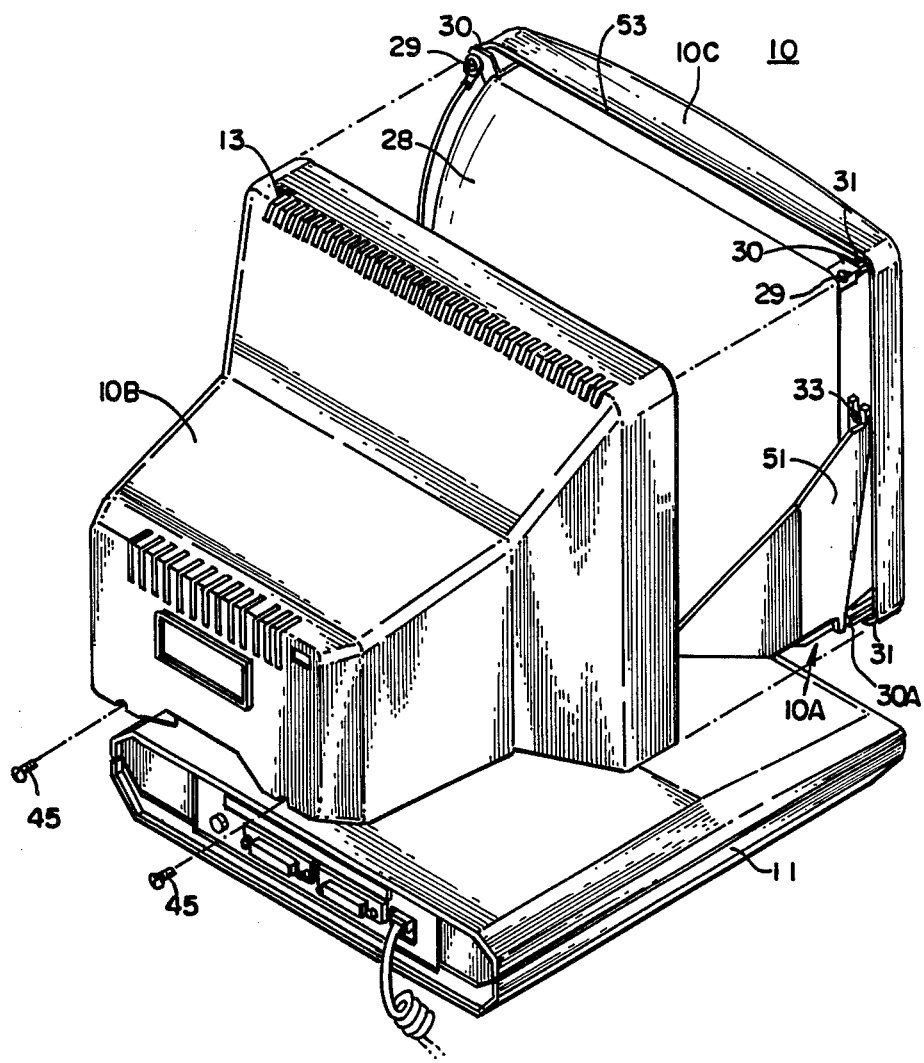
FIG. 7 is an exploded perspective view of the monitor showing the back cover removed from the monitor housing.

Referring now to FIG. 7, monitor housing 10 is shown mounted to base 11. The back cover 10B of monitor housing 10 is seen displaced from its normal mounted position with respect to lower support 10A and bezzel 10C. Back cover 10B is attached to lower support 10A by mounting screws 45. In the mounted position, not only are the CRT and the side portions of lower support 10A enclosed by back cover 10B, but a portion of the bottom of the lower support is also covered. This configuration is revealed in FIG. 8 in which the assembled computer terminal display monitor is shown from a rear perspective view. The bottom portion of lower support 10A which is closest to the side portions of back cover 10B is enclosed by the back cover while the central portion of the bottom of the back cover 10B is left open so that the ball portion 24 can mountably engage base 11.

In order to provide a light, compact, and strong video display monitor, the monitor housing 10 of this invention has a unibody type construction. As used herein, unibody type construction denotes a housing in which the portions used to encase the cathode ray tube also substantially support the cathode ray tube. That is, substantially all portions of the housing serve the dual function of both concealing and supporting the cathode ray tube. In this way, significant cost effectiveness is achieved since substantially the entire housing serves dual functions. As disclosed, the monitor housing 10 of this invention is comprised of three parts: the lower support 10A; bezzel 10C; and back cover 10B. All three of these parts act in a unified way to encase and support the cathode ray tube 28. It is seen that cathode ray tube 28 is mounted to lower support 10A at mounting brackets 30A in the lower portion of buttress 51. These are the only two points at which the cathode ray tube is mounted directly to lower support 10A, and this attachment alone will not support the cathode ray tube. Bezzel member 10C is attached to lower support 10A at the lower and upper extents of buttresses 51 by mounting brackets 30A and mounting notches 33 respectively. The top corners of cathode ray tube 28 are mounted to the top corners of bezzel 10C by mounting screws 29 which passes through CRT mounting brackets 30 and into bezzel mounting ports 31. In this configuration, the upper portion of buttress 51 supports the central region of bezzel 10C and the upper portion of bezzel 10C in turn supports the upper portion of cathode ray tube 28. It should be noted, that the center of gravity of the cathode ray tube 28 is towards the rear of the cathode ray tube, i.e., towards the neck portion 28A. The weight of cathode ray tube 28 thus produces a substantially horizontal component of force displaced above mounting bracket 30A and directed towards the back of the monitor housing. Bezzel member 10C supports cathode ray tube 28 by resisting this horizontal component of force. In the preferred embodiment, there is sufficient strength in the lower support/bezzel combination to safely hold a cathode ray tube in place during the assembly process. In this way, cathode ray tube 28 is safely supported during the controlled conditions of the assembly process during which the back cover 10B is not attached. However, in order to achieve the objectives of this invention, it is preferred that the lower support/bezzel combination is insufficient to safely support the full weight of the cathode ray tube during normal handling and especially during shipping. That is, the material which might otherwise be used to strengthen lower support 10A or bezzel 10C is eliminated since back cover 10B provides significant additional support when the housing is fully assemblied.

Referring now to FIG. 7, back cover 10B is mounted to lower support 10A by mounting screws 45 such that the forward facing of portion of back cover 10B supportively engages the rearward facing portion of bezzel 10C. This engagement between back cover 10B and bezzel 10C provides significant additional support for cathode ray tube 28 by counteracting the horizontal force described earlier. As best shown in FIG. 10A and 10B, this supportive engagement may be achieved by lip 52 on the forward facing portion of back cover 10B engaging the beveled portion 53 of the rearward facing portion of the bezzel 10C. In the preferred embodiment, lip 52 extends around the entire perimeter of back cover 10B and beveled portion 53 extends around the entire perimeter of bezzel 10C. In a preferred embodiment, the housing is designed so that this additional support is not needed during the controlled conditions of the assembly process so that the internal components of the video display monitor can be easily installed. However, this additional support is necessary to safely hold the cathode ray tube during normal handling. This is especially true during the shipping process at which time the cathode ray tube may undergo up to 30 g's of force. In the preferred embodiment of this invention, both bezzel 10C and buttresses 51 will stay within allowable stress limits during maximum expected loading when the housing is fully assembled but would exceed the allowable stress during maximum expected loading if the back cover is not attached. As used herein, an allowable stress limit denotes the stress at which failure occurs divided by a predetermined safety factor. The exact allowable stress limit will depend upon a variety of factors, including the type, thickness and shape of material used, and is determined according to accepted engineering standards for each particular design. In a preferred embodiment, the stress experienced by the bezzel 10C or buttress 51 during maximum expected loading when housing 10 is fully assembled is less than 90 percent of the allowable stress limit. In another preferred embodiment, the stress experienced by the bezzel 10C or buttress 51 during maximum expected loading when housing 10 is fully assembled is less than 50 percent of the allowable stress limit.

Figure 8:
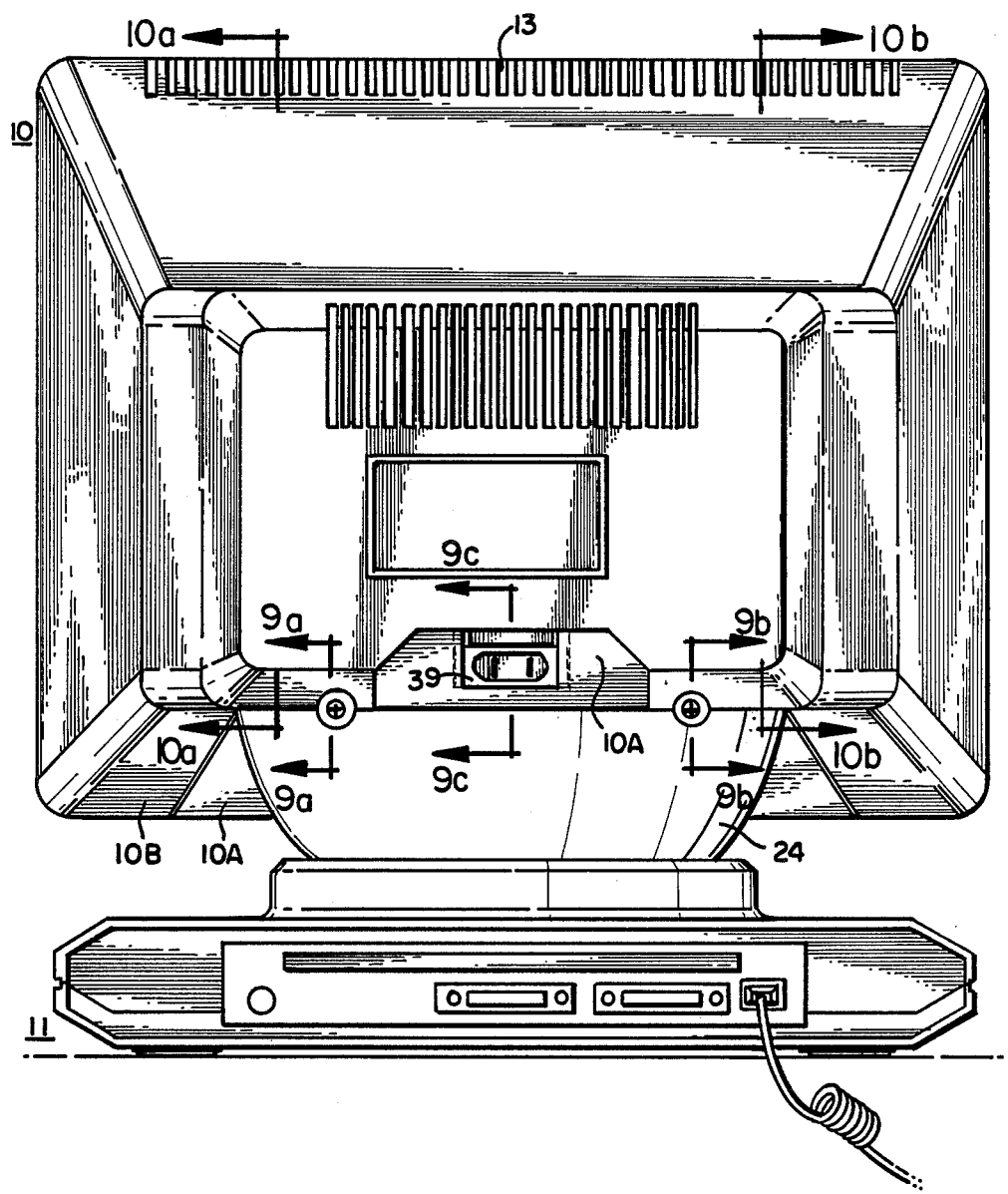
FIG. 8 is a perspective view from behind showing the monitor with the back cover attached.

In order to effectively utilize back cover 10B to supportively engage bezzel member 10C it is preferred that back cover 10B is mounted to lower support 10A in a horizontal plane between lower mounting bracket 30A and upper mounting notch 33. This is shown in FIGS. 8, 10A, and 10B. In the preferred embodiment, back cover 10B is mounted to the rear of lower support 10A in a horizontal plane approximately midway between lower mounting notch 30A and upper mounting notch 33 in buttress 51.

The construction described above provides a light and compact housing for the cathode ray tube by utilizing the same material which covers the cathode ray tube to support the cathode ray tube. In the preferred embodiment of this invention, lower support 10A, back cover 10B, and bezzel 10C are all made entirely of plastic. Due to the unique construction of housing 10, it is possible to construct the housing entirely of "rigid and brittle" plastics. As used herein, a "rigid and brittle" plastic is a plastic having relatively high initial tensile modulus but which usually fails by catastrophic crack propagation at strains on the order of approximately 2%. Examples of this class of plastic are polystyrene, polymethlymethacrylate, and most thermosets. Rigid and brittle plastics are generally inexpensive relative to engineering thermo-plastics. A complete definition of the term "rigid and brittle" plastic can be found in chapter 20 of *Fundamental Principals of Polymeric Materials* by Steven L. Rosen which is incorporated herein by reference. In the preferred embodiment of this invention, video display monitor 10 is made entirely of a rigid and brittle plastic since the unique unibody construction described above allows optimum utilization of materials.

Figure 9A:
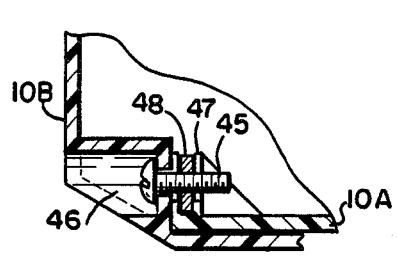
FIG. 9a and FIG. 9b are detailed cross sectional views showing the arrangement for mounting the back cover.
Figure 9B:
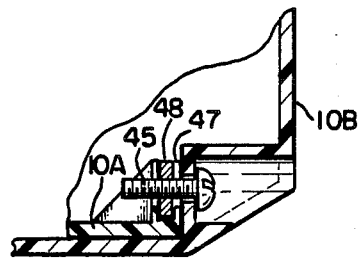

Referring now to FIGS. 9a and 9b, the configuration for mounting back cover 10B to base 10A is shown in detail in a cross sectional view. Back cover 10B has a notched area 46 into which mounting screw 45 is inserted. The rear surface of lower support 10A contains a pair of bolt holding receptacles 47 which contain a pair of bolts 48. Each bolt holding receptacle has a centrally located slot which is aligned with an aperture in back cover notch 46. Mounting bolt 45 passes through said aperture and said slot and threadedly engages bolt 48. It should be noted, that bolt 48 is not fixedly mounted to base 10A, but rather is held within receptacle 47 by the pressure exerted by bolt 45 when back cover 10b is properly mounted to base 10a.

Figure 9C:
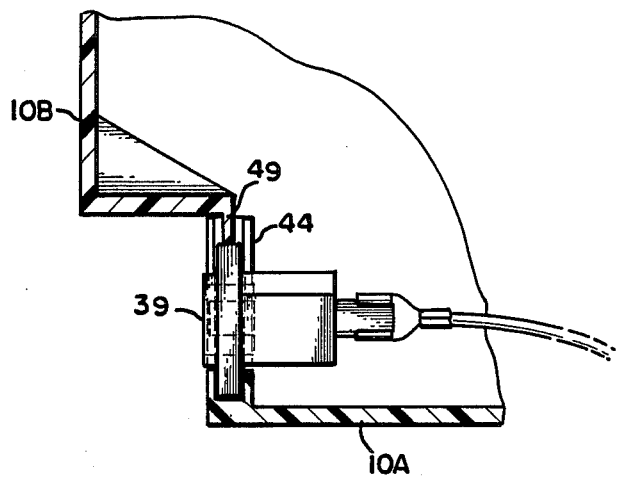
FIG. 9c a detailed cross sectional view showing the arrangement for mounting the power socket for the cathode ray tube.

Referring now to FIG. 9c, the configuration for maintaining power socket 39 within receptacle 44 is disclosed. Back cover 10B contains a tab 49 depending from its surface. When back cover 10B is mounted to lower support 10A, tab 49 enters the open portion of socket receptacle 44 and engages the top surface of power socket 39. In this way, power socket 39 is held within receptacle 44 when the computer terminal display monitor is completely assembled.

Referring now to FIGS. 10a and 10b, the configuration which maintains the printed circuit boards 37 within card guide arms 36 is revealed. Depending from the interior portion of back cover 10B and in alignment with card guide arms 36 is a pair of tabs 50. These tabs are configured so as to engage the upper edge of printed circuit boards 37 when back cover 10B is mounted to lower support 10A. This method of holding printed circuit boards 37 in their proper position within computer terminal monitor 10 facilitates assembly and disassembly of the unit. This is so since removal of back cover 10B from lower support 10A disengages tabs 50, and then the printed circuit board can be easily lifted from between slots 36A in guide arms 36. Likewise, during assembly printed circuit boards 37 merely need to be dropped into place in slots 36A in guide arms 36 and back cover 10B mounted to lower support 10A.

While a particular embodiment of the invention has been shown and described, modifications are within the spirit and scope of the invention. The appended claims, therefore, cover all such modifications.

What is claimed is:

1. An improved mounting device for a video display monitor of the type having a base containing a printed circuit board, a housing mounted to the base and containing a cathode ray tube, and electrical connections running between the base and the housing, wherein the improved mounting device comprises:
   (a) a concave surface in the top of the base, said concave surface having:

(i) an annular slot circumscribing the outer perimeter thereof; and (ii) a wedge shaped opening therein, said opening extending from just below said annular slot to just above the center of said concave surface, wherein said opening is larger in the perimital region than in the central region;

(b) a lubricated "o" ring contained within said annular slot;

(c) a ball portion in the bottom of the housing, said ball portion having:

(i) a convex outer surface substantially conforming to the concave surface in the top of the base;

(ii) a concave inner surface substantially parallel to said convex outer surface;

(iii) a rectangular slot in said ball portion, the long dimension of said slot being substantially perpendicular to the display surface of said CRT;

(d) a cylindrical member mounted to the base and extending from said concave surface in the top of the base through said rectangular slot into the housing, said cylindrical member having a coaxial channel forming a passageway running from the interior of said base to the interior of said housing such that the electrical connections can be passed therethrough;

(e) a pair of coplanar hold-down arms mounted to said cylindrical member and in slidable contact with said concave inner surface of said ball portion such that said convex outer surface of said ball portion is in slidable contact with said lubricated "o" ring; and (f) a finger member resiliently mounted to said ball portion of the housing for movement between a limiting position in which it extends through said rectangular slot and into said wedge shaped opening such that said finger member limits the sliding movement of said housing with respect to said base, and a non-limiting position in which said finger member does not extend into said wedge shaped opening.

2. The improved mounting device of claim 1 wherein said ball portion, said cylindrical member, and said hold down arms are made entirely of plastic.

3. The mounting device of claim 1 wherein said cylindrical member is nonrotatably mounted to the base.

4. The mounting device of claim 3 wherein each of said coplanar hold down arms has a length and a width, the width of said coplanar hold down arms being less than the width of said rectangular slot in said ball portion whereby alignment of the longitudinal axis of said coplanar hold down arms and the longitudinal axis of said slot allows removal of said housing from said base.

* * * * *